US007627490B2

(12) United States Patent
Glick et al.

(10) Patent No.: US 7,627,490 B2
(45) Date of Patent: Dec. 1, 2009

(54) MINISTRY SPECIALIZED INSURANCE TRANSACTION OBJECT ORIENTED SYSTEM AND METHOD

(75) Inventors: Donald L. Glick, Ft. Wayne, IN (US); Daryl G. Pannabecker, Leo, IN (US); Tammy E. Shepherd, Ft. Wayne, IN (US); Michael J. Allison, Ft. Wayne, IN (US); Hugh W. White, North Manchester, IN (US)

(73) Assignee: Brotherhood Mutual Insurance Company, Fort Wayne, IN (US)

( * ) Notice: Subject to any disclaimer, the term of this patent is extended or adjusted under 35 U.S.C. 154(b) by 396 days.

(21) Appl. No.: 09/702,489

(22) Filed: Oct. 31, 2000

(65) Prior Publication Data
US 2004/0015422 A1 Jan. 22, 2004

(51) Int. Cl.
*G06Q 10/00* (2006.01)
(52) U.S. Cl. .................................... 705/4; 705/2; 705/3
(58) Field of Classification Search .................. 705/2–4, 705/35, 26; 707/104.1
See application file for complete search history.

(56) References Cited

U.S. PATENT DOCUMENTS

| | | | | |
|---|---|---|---|---|
| 4,567,359 | A | * | 1/1986 | Lockwood .................. 235/381 |
| 4,831,526 | A | * | 5/1989 | Luchs et al. .................... 705/4 |
| 5,867,821 | A | * | 2/1999 | Ballantyne et al. .............. 705/2 |
| 6,058,391 | A | * | 5/2000 | Gardner .......................... 707/4 |
| 6,144,959 | A | * | 11/2000 | Anderson et al. ............... 707/9 |
| 6,237,035 | B1 | * | 5/2001 | Himmel et al. .............. 709/224 |

OTHER PUBLICATIONS www.progressive.com; Nov. 28, 1999.*
"Volunteers Insurance Service," http://web.archive.org/web/19991009121132/http://www.cimaworld.com/htdocs/volunteers.com.*
"Insurance Services of America," http://web.archive.org/web/19990420161 22/http://www.missionaryhealth.com/.*

* cited by examiner

*Primary Examiner*—Vivek D Koppikar
(74) *Attorney, Agent, or Firm*—Baker & Daniels LLP

(57) ABSTRACT

The present invention involves a ministry and religious institution insurance transaction system and method which allows for quoting, rate determination, policy creation and saving quote and policy application information through a web based interface linking a remote insurance agent or potential customer to an insurance company office. The business method of this invention provides for the sign on and authentication of a remote agent or potential customer who is then allowed to request, gather and submit information for quoting an insurance policy. A copy of the quote information is transferred to the insurance company office system where the quote information is supplemented with rate data. The completed quote is then available for display and editing. The rated quote can be used as a basis for generating a proposal referencing coverage descriptions for the client and as the basis for preparation of a policy application. Copies of the quote information are maintained on the web server and the insurance office computer and made available for other functions to minimize data entry and transmission. The invention further incorporates an optional automated underwriting process in which certain underwriting steps are undertaken electronically, and a ministry policy can be issued and the customer billed without the need for human intervention.

20 Claims, 59 Drawing Sheets

Brotherhood Mutual
Insurance Company

AgentAccess

BROTHERHOODMUTUAL.COM | AGENT*ACCESS* HOME | SITE MAP | CONTACT US | LINKS | USER PROFILE | LOGOUT

Don L Glick
Brotherhood Mutual In House

Account Center

Account List

SEARCH: [ ]  NEW ACCOUNT

VIEW BY NAME | VIEW BY DATE

| Insured Name | Last Accessed | City | State |
|---|---|---|---|
| bob jones | 10/04/2000 | fort wayne | IN |
| Church of the Coles | 10/17/2000 | Ft Wayne | IN |
| First Church of Carol | 10/10/2000 | Cedar City | MO |
| First Church of Christ | 09/15/2000 | Sunnybrooke | MI |
| First Church of God | 10/03/2000 | Columbia City | IN |
| First Leonhardt Church | 10/09/2000 | Fort Wayne | IN |
| First Presbyterian Church | 10/16/2000 | Hudsonville | MI |
| Leonhardt Baptist | 10/05/2000 | Fort Wayne | IN |
| Shepherd Baptist Church | 10/18/2000 | Shepherdsville | IN |
| Zion Lutheran Church | 10/05/2000 | San Francisco | CA |

● PREVIOUS    NEXT ●

Brotherhoodmutual.com | Agent Access Home | Site Map | Contact Us | Links | User Profile | Logout
All users of this site are bound by the System Access and Use License Agreement
Copyright © 2000 Brotherhood Mutual Insurance Company. All rights reserved. View Legal Disclosures.

FIG. 3B

Brotherhood Mutual™
Insurance Company

AgentAccess

BROTHERHOODMUTUAL.COM | AGENTACCESS HOME | SITE MAP | CONTACT US | LINKS | USER PROFILE | LOGOUT testing don I glick
Brotherhood Mutual In House

Account View

Account View

EDIT ACCOUNT | NEW ACCOUNT → 320

First Church of Carol

Account Information

| | |
|---|---|
| Street Address: | 123 Main St |
| City: | Cedar City |
| State: | MO |
| Zip: | 64356 |
| Phone: | (123) 753-1111 |
| Fax: | |
| Web Address: | |
| Contact Name: | Ron Kuhn |
| Contact Phone: | ext: |
| Contact E-mail: | |
| Agent Name: | Carol Kuhn |

Quote Information

▸ Commercial Multi-Peril
▸ Commercial Auto
▸ Electronic Proposal

↙ 330

Brotherhoodmutual.com | Agent Access Home | Site Map | Contact Us | Links | User Profile | Logout
All users of this site are bound by the System Access and Use License Agreement
Copyright © 2000 Brotherhood Mutual Insurance Company. All rights reserved. View Legal Disclosures.

MinistryFirst™
Insuring America's Churches and Related Ministries

About Our Agency

FIG. 4C

Inland Marine

| | | |
|---|---|---|
| Musical Instruments Limit ($): | Deductible ($): | 100 |
| Office Equipment Limit ($): 5000 | Deductible ($): | 250 |
| Computer Equipment Limit ($): | Deductible ($): | 100 |
| Computer Data and Media Limit ($): | *Deductible same as above* | |
| Lawn Equipment Limit ($): | Deductible ($): | 50 |
| Neon Sign Limit ($): | *5% Deductible* | |
| Photo Equipment Limit ($): | Deductible ($): | 100 |

RETURN TO TOP

FIG. 4E

Building Perils: Special ▼

RETURN TO TOP ◄

FIG. 4F

Brotherhood Mutual℠
Insurance Company

SUBMIT | DELETE | HELP | AGENT VIEW | AGENTACCESS HOME

AgentAccess testing don l glick
testing don l glick # 0010

| Policy | Property | Locations | Liability | Liability Details | Clergy |

CMP Quoting                                                New Quote

*Required fields
TEST 1

General Liability

Liability IRPM (%): 0 [ - ▸]

Liability Territory: 1 ▸

General Occurrence Limit ($): 1,000,000 ▸

General Aggregate Multiplier: 3 ▸

Premises Medical Payments Limit ($): 5,000 ▸ (per person)

Activities to Sq. Ft. Ratio: Average ▸

*Size Category: High - 6 or more employees ▸ of Full-time Employees: 5 # of Part-time Employees: 3

FIG. 4G

Liability Classifications

Select all classifications to rate:

- ☑ Church
- ☐ Church Building Including On-Premises Cemetery
- ☐ Church Office Building
- ☐ Playgrounds
- ☐ Mothers Day Out Rated As Day Nursery
- ☐ Miscellaneous Small Retail Stores
- ☐ Thrift Shop
- ☐ Food &/Or Clothing Pantry
- ☐ Mission Church
- ☐ Dwellings - One-Family - Lessors Risk
- ☐ Dwellings - Two-Family - Lessors Risk
- ☐ Apartment, Tenement, Boarding Or Rooming Houses
- ☐ Cemeteries Off Premises
- ☐ Non-Owned Parking Lot
- ☐ Vacant Land - Less Than 5 Acres
- ☐ Vacant Land - 5 Acres Or More
- ☐ Building Or Premises - Commercial Lessor's Risk
- ☐ Real Estate Development Property
- ☐ Lakes Or Ponds
- ☐ Construction Operations - Owner

Other Liability Coverages

Select any other coverages to rate:

- ☐ Parsonage - No Charge
- ☐ Fire Legal (Over $100,000)
- ☐ Nonowned Property Damage
- ☑ Special Events Non-Reporting
- ☑ Nonowned/Rented Vehicle
- ☑ Sexual Misconduct
- ☑ Clergy/Lay Counseling
- ☐ Fee-Based Counseling
- ☑ Religious Communications/Activities
- ☑ Directors And Officers
- ☐ Employee Benefits
- ☐ Employment Practices
- ☑ Discrimination Coverage
- ☑ Defense Reimbursement
- ☑ Religious Operations Athletic Medical
- ☑ Wage Loss Reimbursement
- ☐ Nurse's Professional
- ☐ Pesticide Application
- ☐ Construction Supervision
- ☐ Incidental Broadcasting
- ☑ Clergy Death Benefit RETURN TO TOP 

FIG. 4I

Brotherhood Mutual
Insurance Company

| SUBMIT | DELETE | HELP | AGENT VIEW | AGENT ACCESS HOME | testing don l glick
testing don l glick # 0010

CMP Quoting

| Policy | Property | Locations | Liability | Liability Details | Clergy |

*Required fields
TEST 1

New Quote

Liability Classifications

| | | |
|---|---|---|
| Church | * Sq Ft: | 25000 |
| Church Building Including On-Premises Cemetery | * Sq Ft of Church: | |
| Church Office Building | * Sq Ft: | |
| Playgrounds | How Many? | 1 ▸ |
| Mothers Day Out Rated as Nursery | * Sq Ft: | |
| | Medical Sublimit ($): | Same as Policy Med Sublimit ▸ |
| | Include Students? | No ▸ |
| | # of Students: | |
| Miscellaneous Small Retail Stores | * Sq Ft: | |
| Thrift Shop | * Sq Ft: | |
| Food &/Or Clothing Pantry | * Sq Ft: | |
| Mission Church | * Sq Ft: | |

FIG. 4J

| Field | Value |
|---|---|
| Dwellings - One-Family - Lessors Risk | * How Many? 1 ▸ |
| Dwellings - Two-Family - Lessors Risk | * How Many? 1 ▸ |
| Apartment, Tenement, Boarding Or Rooming Houses | * Sq Ft: |
| Cemeteries Off Premises | * Acres: |
| Non-Owned Parking Lot | * Sq Ft: |
| Vacant Land - Less Than 5 Acres | * Linear Ft: |
| Vacant Land - 5 Acres Or More | * Linear Ft: |
| Building Or Premises - Commercial Lessor's Risk | * Sq Ft: |
| Real Estate Development Property | * Acres: |
| Lakes Or Ponds | * With Swimming 0 ▸  * Without Swimming 0 ▸ (Enter number of Lakes / Ponds in each category) |
| Construction Operations - Owner | * Total Cost ($): |

Other Liability Coverages

| Field | Value |
|---|---|
| Parsonage - No Charge | (No Charge) |
| Fire Legal (over $100,000) | * Liability ($): 100000 (enter total liability amount) |
| Nonowned Property Damage ($100,000 minimum) | * Liability ($): |
| Special Events Non-Reporting | Exposure: Moderate ▸ |
| Nonowned/Rented Vehicle | Sublimit ($): Same as Policy Occur Sublimit ▸  Yes ▸  # of Days: 1 to 21 ▸ |
| | Include Rental Liability/Physical Damage? |

FIG. 4K

| | |
|---|---|
| Sexual Misconduct | Sublimit ($): 300,000 ▼<br>Does applicant currently have a screening program in place? No ▼<br>Screening Credit (%): N/A ▼<br>Include Employment-related Sexual Harrassment and Sexual Acts Liability (BGL-861)?<br>N/A ▼ |
| Clergy/Lay Counseling | Sublimit ($): Same as Policy Occur Sublimit ▼<br>* # of Clergy: 3<br>* # of Trained Lay Counselors: 6 |
| Fee-Based Counseling | Same as Policy Occur Sublimit ▼<br>* Coverage Type: - Select - ▼<br>Average Weekly Hours: 0 to 20 ▼ * # of Counselors: 0 ▼ |
| Religious Communications/Activities | (Flat charge) |
| Directors and Officers | Sublimit ($): Same as Policy Occur Sublimit ▼ * Assets (Millions): - Select - ▼ |
| Employee Benefits | (Flat charge) |
| Employment Practices | Sublimit ($): Same as Policy Occur Sublimit ▼ * Deductible ($): - Select - ▼<br>1. Does the applicant consult an attorney for employment practices liability issues? Yes<br>2. Does the applicant plan to terminate any officers, employees or positions within the next 24 months? No<br>3. In the past 5 years have any incidents occurred, claims been made or suits filed against the applicant involving alleged: discrimination, wrongful termination, breach of contract, or sexual harrassment? No |
| Discrimination Coverage | (Flat Charge) |
| Defense Reimbursement | (Flat Charge) |

FIG. 5A

Brotherhood Mutual
Insurance Company

AgentAccess

HELP | ACCOUNT VIEW | AGENTACCESS HOME testing don l glick
testing don l glick # 0010

PRINT | EDIT QUOTE | APPLY IRPM | CONVERT TO APP

Rated CMP Quote

Liability IRPM (%): 0 | - | ▶

Property IRPM (%): 0 | - | ▶

Brotherhood Mutual Insurance Company
Ministry First Insurance Proposal

Printed: 10/17/2000 10:11 a
Agency Number: 0010
Agent Name: 0 - TESTING DON L ZZ GLICK Brotherhood Mutual Ins.
3434 Kirkland Ave.
Fort Wayne, IN 46805
219-482-8668

Quote #: 95304
Prepared for: TEST 2

456 SPRING STREET

FORT WAYNE, IN 46803

Comments:
Risk Type: Church
Township/F.D.:
State: 13

County: ALLEN

3-Year Fixed: N

|  | Adj Premium | IRPM | Net Premium |
|---|---|---|---|
| ($500 Deductible) Property: | 1342 | 0 | 1342 |
| Liability: | 1037 | 0 | 1037 |
| Totals: | 2379 |  | 2379 |

Building/Personal Property Specifications

Personal Property: 4% per year

Auto Increase - Buildings: 4% per year
Coverage Format: Scheduled Values

FIG. 5C

Loc # : 1 - 456 SPRING STREET
Inside City Limits? : Y
County : ALLEN
Fire Territory : 1
ISO Protection Class : 8
Special Load? : Y
Building # : 1 - CHURCH
Class Code : Church
Construction(s) : *Frame Brick*
Sprinkler? : Under 60%
Largest Open Area : N/A
Open Sided? : N
Alarm Protection? : N
Alarm Type? : N/A
Earthquake Coverage? : N Township/Fire District :
Subscribe to Fire District? : N/A
EC Territory : 1
Special Perils Territory : A
Coinsurance % : 100%

Total Sq. Ft. : < 15
Year Built :
Mine Subsidence? : N
Superior Roof? : N

| Loc/Bldg | Coverage | Repl Cost? | Net Rate | Risk Amt | Net Premium |
|---|---|---|---|---|---|
| 101 | Bldg - Fire/Vandalism | Y | 0.116 | $500,000 | 580 |
| 101 | Bldg - EC | Y | 0.059 | $500,000 | 295 |
| 101 | Bldg - Spec Perils Incl Theft | Y | 0.015 | $500,000 | 76 |
| 101 | Bldg - Automatic Increase | Y | 0.000 | $500,000 | 19 |
| 101 | Pers Prop - Fire/Vandalism | Y | 0.141 | $75,000 | 106 |
| 101 | Pers Prop - EC | Y | 0.059 | $75,000 | 44 |
| 101 | Pers Prop - Spec Perils Incl Theft | Y | 0.057 | $75,000 | 43 |
| 101 | Pers Prop - Automatic Increase | Y | 0.000 | $75,000 | 4 |

Policy Coverage Options

| Coverage | Repl Cost? | Net Rate | Risk Amt | Net Premium |
|---|---|---|---|---|
| $500 Deductible | | 0.000 | | -150 |
| Fidelity Bond | | 0.000 | $2,500 | 0 |
| Prop Protector+ & Ordinance And Law Endorsement - $10000 Water Damage Limit | | 0.000 | | 162 |
| Coverage System Equipment Breakdown | 500 | 0.000 | $575,000 | 163 |

FIG. 5D

General Liability

Activities to Sq Ft Ratio : Low
Size Category : Low # of Full-time employees 3
# of Part-time 1 employees

Limits of Liability
Each Occurrence : 1,000,000
Medical Payments (per person) : 5,000
General Aggregate : 3,000,000

Liability Territory : 1

Liability Classifications

Church:                                                                 Sq Ft : 12000

Other Liability Coverages

| | |
|---|---|
| Special Events Non Reporting: | Exposure : Moderate |
| | Sublimit : Policy Limit |
| Nonowned/Rented Vehicle: # of Days : 1 to 21 | Include Rental Liability/Physical Damage ? Y |
| | Sublimit : 300,000 |
| Sexual Misconduct: Screening Program ? N | Screening Credit : 0 |
| | Sublimit : Policy Limit |
| Clergy/Lay Counseling: # of Clergy : 2 | # of Lay Counselors : |
| Religious Communications/Activities: | Flat Charge |
| Directors & Officers: Assets : 0 - 3M | Sublimit : Policy Limit |
| Discrimination Coverage: | Flat Charge |
| Defense Reimbursement: | Flat Charge |
| Religious Operations Athletic Medical: | Sublimit : Policy Med Limit |
| Wage Loss Reimbursement: | Flat Charge |
| Clergy Death Benefit: | Flat Charge |

Liability Details

| Class | Coverage | Net Rate | Exposure Amt | Net Prem |
|---|---|---|---|---|
| Church | BI/PD | 2.098 | 12,000 | 252 |
| Church | BI/PD Operations | 8.404 | | 8 |
| Church | Med Payments | 0.960 | 12,000 | 115 |
| Church | Med Operations | 8.282 | | 8 |
| Church | Protect Plus | 13.576 | | 14 |
| SPECIAL EVENT | | 50.019 | | 50 |
| N/O VEH LIAB | | 22.736 | 1 | 23 |
| Rent VEH LIAB | | 31.830 | 1 | 32 |
| Rent VEH PHYD | | 22.140 | 1 | 22 |
| SX L&D NO SCR | | 175.000 | 1 | 175 |
| PAST COUNSEL | | 19.394 | 2 | 39 |
| RELIG COMM | | 12.929 | 1 | 13 |
| D & O 0-3 MIL | | 109.133 | 1 | 109 |
| DISCRIMNATION | | 14.222 | 1 | 14 |
| DEFENSE COST | | 60.000 | 1 | 60 |
| ATHLETIC LIAB | | 6.465 | | 6 |
| RELIG ATH MED | | 53.833 | 1 | 54 |
| WAGE LOSS | | 7.380 | 1 | 7 |
| CLERGY DEATH | | 36.000 | | 36 |

*-- End of Quote --*

FIG. 5E

FIG. 6B (rotated form page)

* Mailing Address: 910 W. CHURCH
* City: FORT WAYNE  * State: IN
* Zip Code: 46805

Bill to: Insured

Billing name: (Billing name and address required if other than insured)

Billing Address:

City: State:

Zip Code:

CMP Billing Mode: Annual
Legal status of Applicant: Corporation  Not-for-profit
* Year founded: (YYYY)  Years at this location:
Risk Type: Church with Both Comments:

RETURN TO TOP

You did not enter an Insured name. This lienholder will not be saved. Click cancel to continue editing this document.

OK        Cancel

Have you been uninsured at any time during the past three years?   No ▶

If Yes, please explain:

Has any insurance company cancelled or refused to renew any CMP, Auto, or Worker's Compensation policy for you in the last 5 years?   No ▶

If Yes, please explain:

Loss History
* Within the last 5 years, please describe any loss paid by an insurance company, any loss pending that has not been paid, or any loss greater than $1,000 that was not covered by insurance: ☐ None

| Description of Loss | Date of Loss | Amount of Loss |
|---|---|---|
| | | |
| | | |
| | | |

Has your organization or its leaders (in connection with your organization) been a party to any lawsuit during the past five years?   No ▶

If Yes, please give detailed explanation:

Are you aware of any past or present situation or dispute that could result in a claim or lawsuit being made against your organization or its leaders?   No ▶

If Yes, please give detailed explanation:

Fraud Statement

Brotherhood Mutual Insurance Company relies on the *information provided in this application and supplemental coverage request forms to determine whether a proposal or policy will be issued and at what premium level*. Any person who knowingly and with intent to defraud an insurance company, files an application for insurance containing any materially false information, or concealing any material information, will be subject to any and all applicable civil, criminal, and contractual penalties.

* Person interviewed: _____

Title: _____

* Date: _____ (MM/DD/YYYY)

RETURN TO TOP

Brotherhood Mutual℠
Insurance Company

SUBMIT | DELETE | HELP | AGENT VIEW | AGENT ACCESS HOME testing don l glick
testing don l glick # 0010

CMP Application

CMP Application | Supplemental Forms | Actions

TEST 3 - Quote # 95305

Errors for Insurance History
You have omitted some important information on the Insurance History page. You may either return to the page now to fill out the information or you may continue and return at a later time. You will be required to complete this information before you can submit this application.

Click here to go back to the Insurance History page --> Go Back

Click here to continue and come back later --> Continue

| Missing Fields | Other Errors |
|---|---|
| * Name of person interviewed<br>* Date person interviewed | * At least one previous insurance company must be provided<br>* Loss History must be provided - either indicate no losses by marking the None checkbox or provide details of loss |

Brotherhood Mutual
Insurance Company

| SUBMIT | DELETE | HELP | AGENT VIEW | AGENT ACCESS HOME |

*AgentAccess* testing don l glick
testing don l glick # 0010

CMP Application

CMP Application | Supplemental Forms | Actions

Quote # 95305

- General Information
- Mortgagees, Loss Payees, & Additional Insureds
- Insurance History
- Property Coverages
- Building & Coverages
  910 W. CHURCH
  ■ CHURCH
  ▸ SCHOOL
    3452 N. WELLS
  ▸ Inland Marine Schedules
- Liability Coverages
- Clergy Coverages
- File Attachments

*Required fields*

TEST 3

Building Information
Occupancy: CHURCH - Loc 1 Bldg 1
Building Class: Church

| Building | Contents |
|---|---|
| Limit ($): 1,500,000.00 | 250,000.00 |

Address: 910 W. CHURCH
* City: FORT WAYNE          * State: IN
* Zip Code: 46805

Interest in Building: Owner/occupant ▼
If landlord, describe occupancy of tenant:

* Number of Fire Extinguishers: ____
  Wood-burning Stove?  No ▼  Wood Burning Stove Report Security Alarm Systems

Extent of Protection:
☐ Protects all exterior openings
☐ Protects all ceilings - floors- and walls
☐ Interior sound / motion detectors or beams
☐ Protects only doors with contacts

**\* Type of Protection:**
☐ Local (Loud sounding outside alarm)
☐ Central station alarm company (24 hours)
☐ Auxiliary to attended police station
☐ Watchman on duty afterhours

**\* Response Time (Guard or Police):**
Does not exceed 15 minutes (A)
Does not exceed 20 minutes (B)
Does not exceed 30 minutes (C)
N/A Does central station alarm company have keys to insured's property? [No ▾]

Is there a maintenance contract for regular inspection and service of the alarm? [Yes ▾]

Frequency of service: _____

Fire Alarm Systems

Type of Alarm:
☐ Manual pull station
☐ Smoke
☐ Heat

If building is sprinklered:
☐ Water flow alarm
☐ Low water pressure alarm
☐ Gate valve supervision

**\* Type of Protection:**
☐ Local (Outside alarm)
☐ Central station alarm (24 hours)
☐ Auxiliary to attended fire / police station
☐ Watchman on duty afterhours Extent of property protected by fire alarm: _____ % [▾]

Does central station alarm company have keys to insured's property? [No ▾]

Is there a maintenance contract for regular inspection and service of the alarm? [Yes ▾]

Frequency of service: _____

Property Survey and Pictures

You may attach the property survey and/or pictures of this building here:

Files attached so far: None

Type in name of file to attach or use browse button for assistance.

If you need to attach more than one file, Click here after filling in the file name above for each file.

RETURN TO TOP

Property Survey and Pictures

You may attach the property survey and/or pictures of this building here:
Files attached so far: None
Type in name of file to attach or use browse button for assistance.

If you need to attach more than one file, Click here after filling in the file name above for each file.

RETURN TO TOP

FIG. 7F

Brotherhood Mutual™
Insurance Company

| SUBMIT | DELETE | HELP | AGENT VIEW | AGENT ACCESS HOME |

AgentAccess testing don l glick
testing don l glick # 0010

CMP Application

CMP Application | Supplemental Forms | Actions

TEST 3 - Quote # 95305

Errors for Building & Coverages
You have omitted some important information on the Building & Coverages page. You may either return to the page now to fill out the information or you may continue and return at a later time. You will be required to complete this information before you can submit this application.

Click here to go back to the Building & Coverages page --> Go Back

Click here to continue and come back later --> Continue

| Missing Fields | Other Errors |
|---|---|
| * Number of Fire Extinguishers | |

Brotherhood Mutual℠
Insurance Company

AgentAccess

SUBMIT | DELETE | HELP | AGENT VIEW | AGENTACCESS HOME testing don l glick
testing don l glick # 0010

CMP Application

CMP Application | Supplemental Forms | Actions

* Required fields

- General Information   TEST 3
- Mortgagees, Loss Payees, & Additional Insureds
- Insurance History
- Property Coverages
- Building & Coverages
- Inland Marine Schedules
  - New Entry
- Liability Coverages
- Clergy Coverages
- File Attachments Quote # 95

Select New Schedule Type:  Scheduled Misc Property  ▼   ADD SCHEDULE

1. _____  Value $ _____ 0     Sub-T _____

2. _____  Value $ _____ 0     Sub-T _____

3. _____  Value $ _____ 0     Sub-T _____

4. _____  Value $ _____ 0     Sub-T _____

| | Value $ | Sub-T |
|---|---|---|
| 6. | | 0 |
| 7. | | 0 |
| 8. | | 0 |
| 9. | | 0 |
| 10. | | 0 |
| 11. | | 0 |
| 12. | | 0 |
| 13. | | 0 |
| 14. | | 0 |
| 15. | | 0 |
| 16. | | 0 |

FIG. 8C

| | | |
|---|---|---|
| 17. | Value $ | 0 | Sub-T |
| 18. | Value $ | 0 | Sub-T |
| 19. | Value $ | 0 | Sub-T |
| 20. | Value $ | 0 | Sub-T |

Additional Comments:

◄ ▶ RETURN TO TOI

Brotherhood Mutual™
Insurance Company

CMP Application

AgentAccess

SUBMIT | DELETE | HELP | AGENT VIEW | AGENTACCESS HOME testing don l glick
testing don l glick # 0010

CMP Application | Supplemental Forms | Actions

* Required fields

- General Information
- Mortgagees, Loss Payees, & Additional Insureds
- Insurance History
- Property Coverages
- Building & Coverages
- Inland Marine Schedules
- Liability Coverages
- Clergy Coverages
  1
- File Attachments

TEST 3
Clergy Information

Quote # 95305

Pastor's Name [_____] Clergy # 1

Sublimit for Jewelry, Fine Arts, etc:
- ☐ Attach scanned image
- ☐ US Mail
- ☐ FAX
- ☐ Online Schedule  Inland Marine Schedule Sublimit for Office Equipment, Sports, etc:
- ☐ Attach scanned image
- ☐ US Mail
- ☐ FAX
- ☐ Online Schedule  Inland Marine Schedule

Additional Interest

Type: [Additional Insured ▼]

Name: [_____]

Address: [_____]

City: [_____]  State: [__]

Zip Code: [_____]

Loan number: [        ]

Describe property under the lien or subject to additional insured coverage:

RETURN TO TOP

FIG. 10C

Brotherhood Mutual
Insurance Company

SUBMIT | DELETE | HELP | AGENT VIEW | AGENTACCESS HOME

AgentAccess testing don l glick
testing don l glick # 0010

CMP Application

CMP Application | Supplemental Forms | Actions

TEST 3 - Quote # 95305

Errors for Clergy Coverages
You have omitted some important information on the Clergy Coverages page. You may either return to the page now to fill out the information or you may continue and return at a later time. You will be required to complete this information before you can submit this application.

Click here to go back to the Clergy Coverages page --> Go Back

Click here to continue and come back later --> Continue

| Missing Fields | Other Errors |
|---|---|
| * Clergy Name | * Indicate how the IM Schedule for Jewelry, Fine Arts, etc will be provided<br>* Indicate how the IM Schedule for Office Equipment, Sports, etc will be provided |

FIG. 11

Brotherhood Mutual
Insurance Company

SUBMIT | DELETE | HELP | AGENT VIEW | AGENT*ACCESS* HOME

AgentAccess testing don l glick
testing don l glick # 0010

CMP Application

CMD Application | Supplemental Forms | Actions

- Church Profile
  - Primary
- School/Day Care Profile
- Property Risk Survey
- Liability Risk Survey \* Required fields
TEST 3

*1200*

Quote # 95305

Church Profile (Primary Risk)

Average worship attendance this year: ____

Average worship attendance last year: ____

\* Number of weekly worship services and regularly scheduled meetings and events: ____

Estimated current year budget: ____

Seating capacity of sanctuary / auditorium: ____

Ministry setting: Suburban ▼

Average number of junior / senior high youth active in weekly programs: ____

Church Authority

* The church government is described as: - Select -

* Major decision-making authority rests with: - Select -

* Does the pastor have the authority to make large organizational or financial decisions without approval from any governing board? - Select -

Note, cannot bind if pastor has major decision making authority

Additional Information:

RETURN TO TOP

FIG. 12C

Brotherhood Mutual Insurance Company

SUBMIT | DELETE | HELP | AGENT VIEW | AGENT*ACCESS* HOME testing don l glick
testing don l glick # 0010

CMP Application

CMP Application | Supplemental Forms | Actions

TEST 3 - Quote # 95305

Errors for Church Profile
You have omitted some important information on the Church Profile page. You may either return to the page now to fill out the information or you may continue and return at a later time. You will be required to complete this information before you can submit this application.

Click here to go back to the Church Profile page --> Go Back

Click here to continue and come back later --> Continue

| Missing Fields | Other Errors |
|---|---|
| * Number of weekly worship services & events<br>* Church government<br>* Major decision-making authority<br>* Pastor authority | |

FIG. 12D

Brotherhood Mutual
Insurance Company

SUBMIT | DELETE | HELP | AGENT VIEW | AGENTACCESS HOME

*AgentAccess* testing don l glick
testing don l glick # 0010

CMP Application

CMP Application | Supplemental Forms | Actions

- Church Profile [R]
- School/Day Care Profile [R]
- Property Risk Survey [R]
- Liability Risk Survey [R]

*\* Required fields*

TEST 3

Quote # 95305

Liability Risk Survey

Does the applicant have a safety/risk management policy for their premises and activities?   No ▾

General condition of premises:

Are all the floor surfaces in good condition, free from tripping / slipping hazards?   Yes ▾

Are all the stairways in good condition and well lit?   Yes ▾

Are there solid handrails for all the steps and stairways?   Yes ▾

Is there a formal snow and ice removal plan for lots and walkways?   No ▾

Are all the buildings equipped with emergency lighting that activates during power loss?   Yes ▾

Are all the exit doors equipped with panic hardware and unlocked during occupancy?   Yes ▾

Current exposures on owned or leased premises:
*(Check all that exist)*   ☐ None of the exposures below exist on premises

FIG. 12E

☐ Elevators/escalators/lifts
☐ Baptistry
☐ Playgrounds with equipment
Type equip:
Ground cover:
☐ Outdoor athletic fields/courts
Type:
☐ Stadiums or bleachers
Capacity:
☐ Indoor gymnasium
☐ Fitness or exercise training
☐ Weight training equipment
☐ Trampolines
☐ Stages (2 ft. or higher)
☐ Balconies or lofts ☐ Swimming Pools
☐ Lake or Pond
☐ Diving boards
☐ Thrift shops
☐ Food banks
☐ Certified life guards
☐ Stadiums or bleachers
☐ Animals kept on premises
Type:
☐ Goods - services - food sold
Describe:
☐ Goods manufactured for sale
Describe:
☐ Radio / TV broadcasts
Describe:

Do outside groups use the premises on a recurring basis? No ▶

List the groups:

Is written use of the premises agreement required? No ▶

If yes, how will a copy be provided? N/A ▶

* Is there any overnight sheltering permitted on any owned premises? - Select - ▶

If yes, please describe:

Any there any parking lots on the owned premises? Yes ▶

Describe the parking lot surface: Paved ▶

Any parking lots separated from premises by a public roadway? No ▶

Are all the parking lots well lit? No ▶

Please describe any other exposures on the owned premises: _____

Exposures from sponsored activities:

| | | |
|---|---|---|
| Hay rides: | ☐ Last 3 yrs | ☐ Next 3 yrs |
| Snow skiing trips: | ☐ Last 3 yrs | ☐ Next 3 yrs |
| Snowmobiling trips: | ☐ Last 3 yrs | ☐ Next 3 yrs |
| Water skiing trips: | ☐ Last 3 yrs | ☐ Next 3 yrs |
| Rafting / canoeing trips: | ☐ Last 3 yrs | ☐ Next 3 yrs |
| Rock climbing / rappelling trips: | ☐ Last 3 yrs | ☐ Next 3 yrs |
| Cycling trips: | ☐ Last 3 yrs | ☐ Next 3 yrs |
| Sponsored carnivals or circuses: | ☐ Last 3 yrs | ☐ Next 3 yrs |
| Sponsored road rallies: | ☐ Last 3 yrs | ☐ Next 3 yrs |
| ATV, go-cart, or dirt bike events: | ☐ Last 3 yrs | ☐ Next 3 yrs |
| Fireworks displays sponsored: | ☐ Last 3 yrs | ☐ Next 3 yrs |
| Admissions charged for public events: | ☐ Last 3 yrs | ☐ Next 3 yrs |
| Sports leagues sponsored by you: | ☐ Last 3 yrs | ☐ Next 3 yrs |
| List type: | | |
| Any other sports league participation? | ☐ Last 3 yrs | ☐ Next 3 yrs |
| List type: | | |
| Group trips at more than 50 miles distance: | ☐ Last 3 yrs | ☐ Next 3 yrs |
| Estimated number per year: | (Last 3 yrs) | (Expected next 3 yrs) |
| Foreign mission trips: | ☐ Last 3 yrs | ☐ Next 3 yrs |
| Estimated number of participants: | (Last 3 yrs) | (Expected next 3 yrs) |
| Weekend retreats: | ☐ Last 3 yrs | ☐ Next 3 yrs |
| Estimated number of retreats per year: | (Last 3 yrs) | (Expected next 3 yrs) |
| Estimated number of participants per year: | | |
| Overnight youth "lock-ins": | ☐ Last 3 yrs | ☐ Next 3 yrs |
| Camps owned or operated: | ☐ Last 3 yrs | ☐ Next 3 yrs |

FIG. 12F

MINISTRY SPECIALIZED INSURANCE TRANSACTION OBJECT ORIENTED SYSTEM AND METHOD

BACKGROUND OF THE INVENTION

1. Field of the Invention

The invention relates to quoting, proposing, and contracting insurance policies for property and casualty coverages. More specifically, the field of the invention is that of a network based quoting and contracting system providing such coverages for ministries and church type organizations.

2. Description of the Related Art

Insurance companies offer insurance policies for covering potential liabilities or damages relating to property and casualty events. Such insurance companies either operate through agents who act on behalf of customers to obtain policies, or interact directly with customers in issuing policies. For companies that market their products through agents, the agents are either dedicated employees or independent agency organizations, and they interact with potential purchasers of the insurance policies. Typically, an insurance agent elicits information from the potential purchaser and sends that quote information to the insurance company for a quote. The quote information is less than the total amount of information needed to underwrite the policy, but includes sufficient information to calculate a commercially reasonable estimate of the final policy cost. The insurance company uses the quote information to calculate the likely cost or range of costs for the policy, and provides that information to agent to convey to the potential purchaser.

Once the potential purchaser decides to continue the insurance application process, the agent then needs to obtain further information to complete an insurance application and submit it to the insurance company. The insurance company applies its policy rate calculations to all the information obtained from the potential customer and prepares a final insurance policy document. This document may include one or more blanks for pieces of information unrelated to the rate calculation but needed to create the insurance contract with the potential purchaser. Only after completing the final insurance policy document and obtaining the necessary signatures does the policy come into effect. For companies that market insurance directly to the customer, information needed to issue the policy is obtained directly from the potential customer. A quote containing the insurance cost is conveyed directly back to the customer without the involvement of any agent or other intermediary.

This process of quoting and completing the insurance policy is well known in the insurance industry, and involves several potentially cumbersome steps of data entry, communication, and calculation. Each of these steps may be subject to interruption or delay, and each may or may not be tailored to specific insurance needs. One general insurance need is that of property and casualty insurance, which protects an organization from random damages and potential legal liability for casualty losses to other parties. In order for an insurance company to properly assess a potential purchaser, many pieces of information relating to the property and potential liabilities of the organization need to be collected and analyzed. Further, for certain types of potential purchasers, the special situations of those potential purchasers need to be accounted for in the quoting and rate calculation process.

One example of a special situation is that of ministries and similar organizations. Typically, churches and other religiously affiliated institutions have physical properties and a wide variety of activities, and thus have many potential areas where the risk of liability is significant. In order to assess those risks, more particular types of information need to be gathered. Additionally, the potential purchasers may have several liability concerns which require very specific insurance coverage. Churches and other religiously affiliated institutions require specialized coverages to efficiently address the ministry-focused nature of these entities. Such coverages include, but are not limited to, the following: membership emotional injury, student emotional injury, clergy ordination/placement, sexual acts, counseling acts, religious communication, religious activity, discriminatory acts, Christian school and college coverages, Christian camp coverages, church transportation, foreign mission operations, as well as other ministry-specific coverages. In addition to these ministry-specific coverages, standard property, liability, automobile, and workers' compensation coverage are also provided.

The conventional process of gathering data and calculating quotes and rates is even more cumbersome for special situations than with a more typical business insurance policy. Further, because much of this data gathering for ministry-related insurance policies requires such non-standard information, conventional processes may not fully support the type of inquiries needed.

SUMMARY OF THE INVENTION

The present invention is a religious institution insurance transaction system and method which allows for quoting, rate determination, and policy creation by an automated series of data gathering which may be accomplished over a computer network. The system utilizes a series of predetermined initial inquiries about the desired ministry insurance, and based on responses to those initial inquiries generates additional inquiries to complete the data needed to assess a ministry insurance situation.

The present invention, in one form, relates to a method for developing a quote for an insurance policy. The agent or potential customer using the system provides information about the scope of ministry operations, premises and property owned and liability limits sought, the types of specific coverage desired, and other rating and underwriting information. This information is gathered and transmitted to the central office where a rating process is used to develop a rate, constituting an accumulation factor based on the quote data. The quote can be derived from newly entered information or an existing policy can be used as a template; or alternatively, information can be taken from another draft quote. Quotes once entered are available for review and/or editing remotely by the agent, or locally by home office personnel.

The present invention, in another form, is a method for creating a policy application from a quote. Upon the agent's or potential customer's designation, data associated with a quote is extracted and used for building an application. The application is tailored (fields are pre-filled) based upon the quote information. Following processing, the policy and premium billing will be issued.

Further aspects of the present invention involve printing quotes and applications in the agent's office and the development of insurance proposals for presentation to potential customers. These proposals can incorporate a reference or link to information describing in detail the insurance coverages listed in the proposal.

Another aspect of the invention relates to a machine-readable program storage device for storing encoded instructions for a method of quoting, rating, and saving quote information for ministry-related insurance transactions through a web based interface according to the foregoing method.

The invention further incorporates an automated underwriting process in which a set of specific questions are asked of the agent or potential ministry customer, and, based on the response to these questions, a policy can be rated and issued to the ministry without the need for human intervention.

Other advantages of the invention include decreased home office data entry, increased accuracy due to less redundant data entry, increased speed of delivery of information due to the elimination of mail service from the process, and increased efficiency.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 2A is a screen display of the Brotherhood Mutual home page.

Figure 4E:
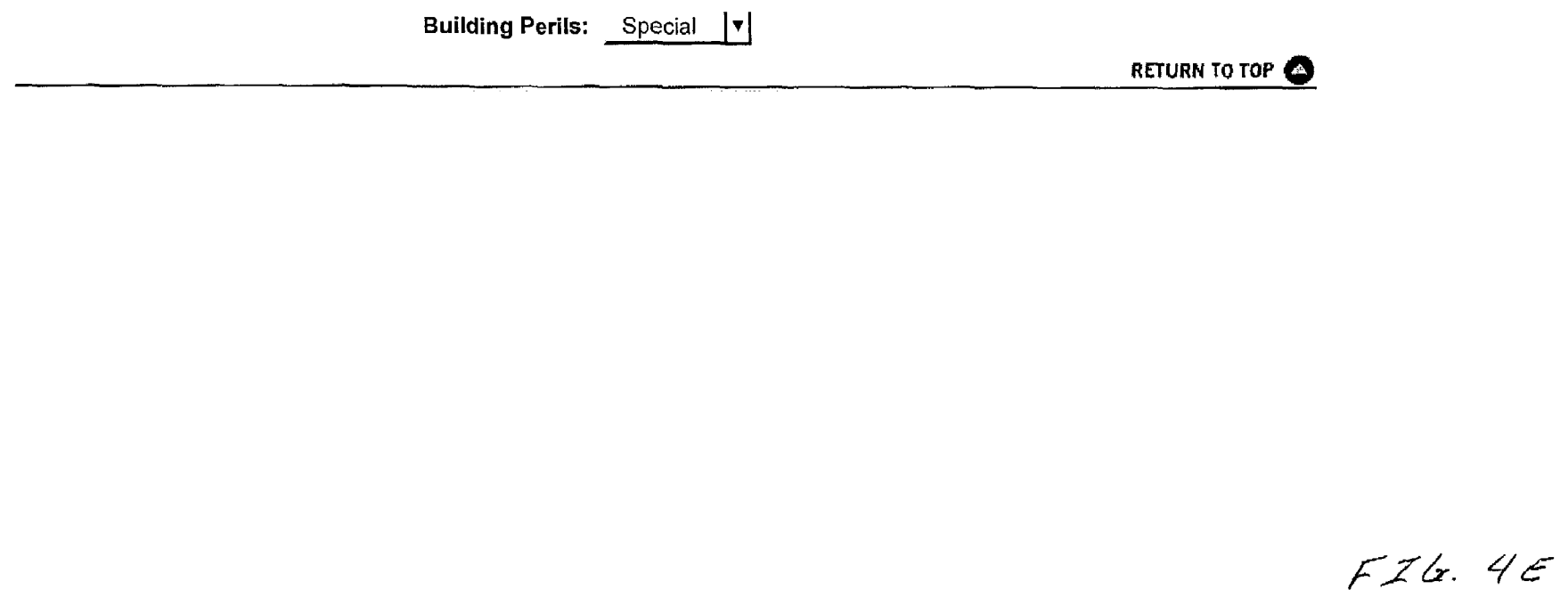

FIGS. 4A-4L are screen displays showing the data associated with a quote.

FIGS. 5A-5E depict the screen displays showing the detail of a rated quote.

FIGS. 6A-6C depict screen displays associated with the General Information relating to a policy application.

FIGS. 6D-6E depict screen displays showing an example of a new entry for a coverage category having no previous information in a policy application.

FIGS. 6F-6I depict screen displays associated with the Insurance History coverage category in a policy application.

FIGS. 7A-7G depict screen displays associated with the Building and Coverages coverage category showing its subcategories in a policy application.

FIGS. 8A-8C depict screen displays associated with the Inland Marine coverage category in a policy application.

FIGS. 10A-10C depict screen displays associated with the Clergy Coverages coverage category in a policy application.

FIGS. 12A-12C depict screen displays associated with the supplementary information for the Church Profile category in a policy application.

FIGS. 12D-12H depict screen displays associated with the supplementary information for the Liability Risk category in a policy application.

Figure 1:
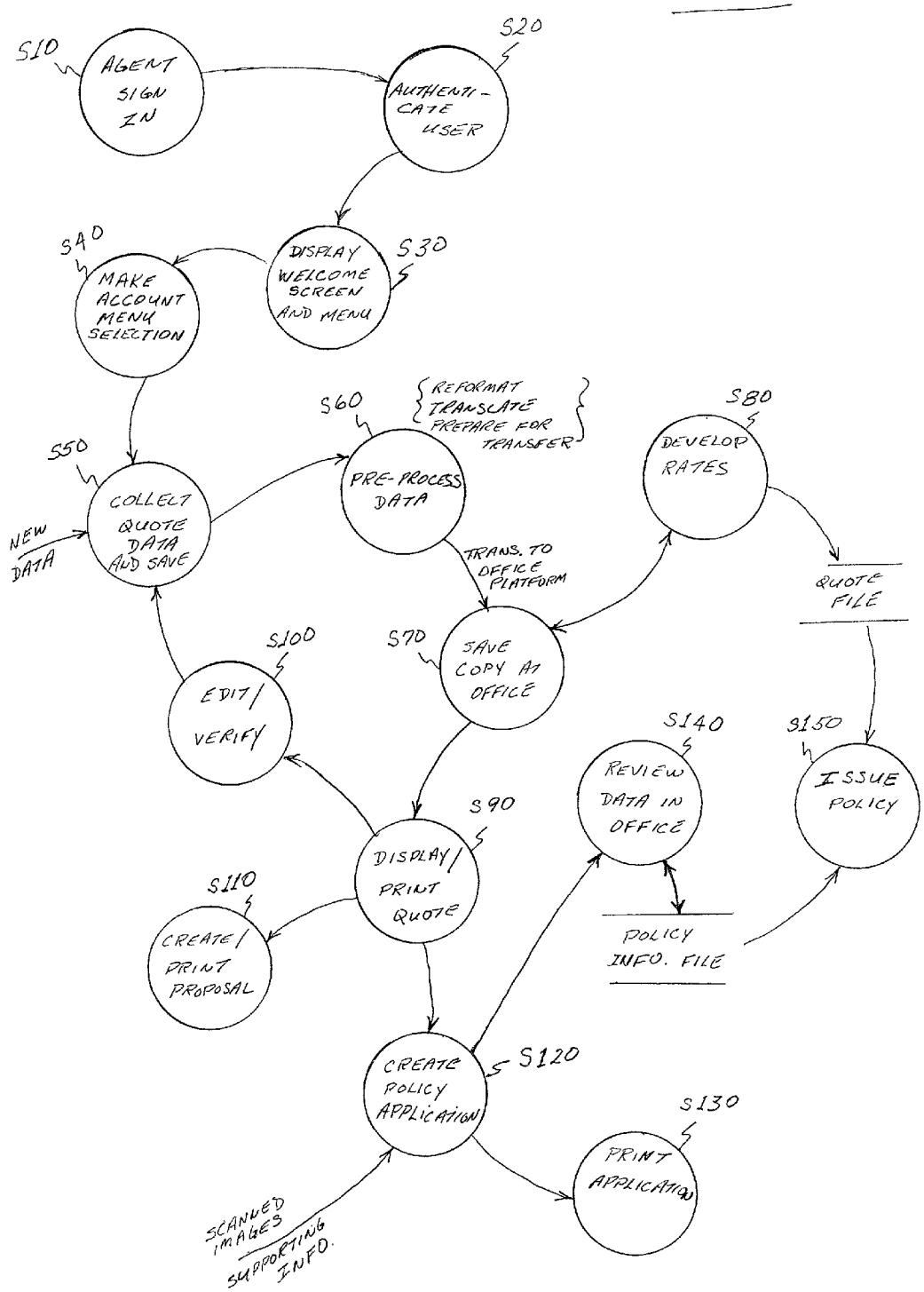
FIG. 1 is a process flow of one embodiment of the method of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

The detailed descriptions which follow are presented in part in terms of algorithms and symbolic representations of operations on data bits within a computer memory representing alphanumeric characters or other information. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical signals.

The present invention also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

The present invention deals with "object-oriented" software, and particularly with an "object-oriented" operating system. The "object-oriented" software is organized into "objects", each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions, for example, by a user activating an icon with a "mouse" pointer generating an event. Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed to access. One feature of the object-oriented system is inheritance. For example, an object for drawing a "circle" on a display may inherit functions and knowledge from another object for drawing a "shape" on a display.

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system can be modeled with an object, the behavior of each component being simulated by the methods of its corresponding object, and the interactions between components being simulated by messages transmitted between objects.

An operator may stimulate a collection of interrelated objects comprising an object-oriented program by sending a message to one of the objects. The receipt of the message may cause the object to respond by carrying out predetermined functions which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which can be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks can access the network resources, such as shared data files, common peripheral devices, and inter-workstation communication. Users activate computer programs or network resources to create "processes" which include both the general operation of the computer program along with specific operating characteristics determined by input variables and its environment.

The term "Browser" refers to a program which is not necessarily apparent to the user, but which is responsible for transmitting messages between the workstation and the network server and for displaying and interacting with the network user. Browsers are designed to utilize a communications protocol for transmission of text and graphic information over a world wide network of computers, namely the "World Wide Web" or simply the "Web". Examples of Browsers compatible with the present invention include the Navigator program sold by Netscape Corporation and the Internet Explorer sold by Microsoft Corporation (Navigator and Internet Explorer are trademarks of their respective owners). Although the following description details such operations in terms of a graphic user interface of a Browser, the present invention may be practiced with text based interfaces, or even with voice or visually activated interfaces, that have many of the functions of a graphic based Browser.

Browsers display information which is formatted in a Standard Generalized Markup Language ("SGML") or a HyperText Markup Language ("HTML"), both being scripting languages which embed non-visual codes in a text document through the use of special ASCII text codes. Files in these formats may be easily transmitted across computer networks, including global information networks like the Internet, and allow the Browsers to display text, images, and play audio and video recordings. The Web utilizes these data file formats in conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the stylesheet formatting are separately contained (formatting may be thought of as methods of displaying information, thus an XML file has data and an associated method).

One version of the present invention will be described with reference to the process flow depicted in FIG. 1. Each step in the process flow represents a sub element of the overall business method of the present invention. The diagram generally represents the necessary events, communications and information transfers necessary to accomplish the subject business method. Some events are customarily performed at the agent's site while others are performed at the insurance company's site. However, in general, no significance should be attributed the physical location of a particular event. Similarly, actions designated as being performed by an agent may also generally be performed by a customer or potential customer. Any item strictly limited to an agent will be so designated in this discussion.

Figure 2A:
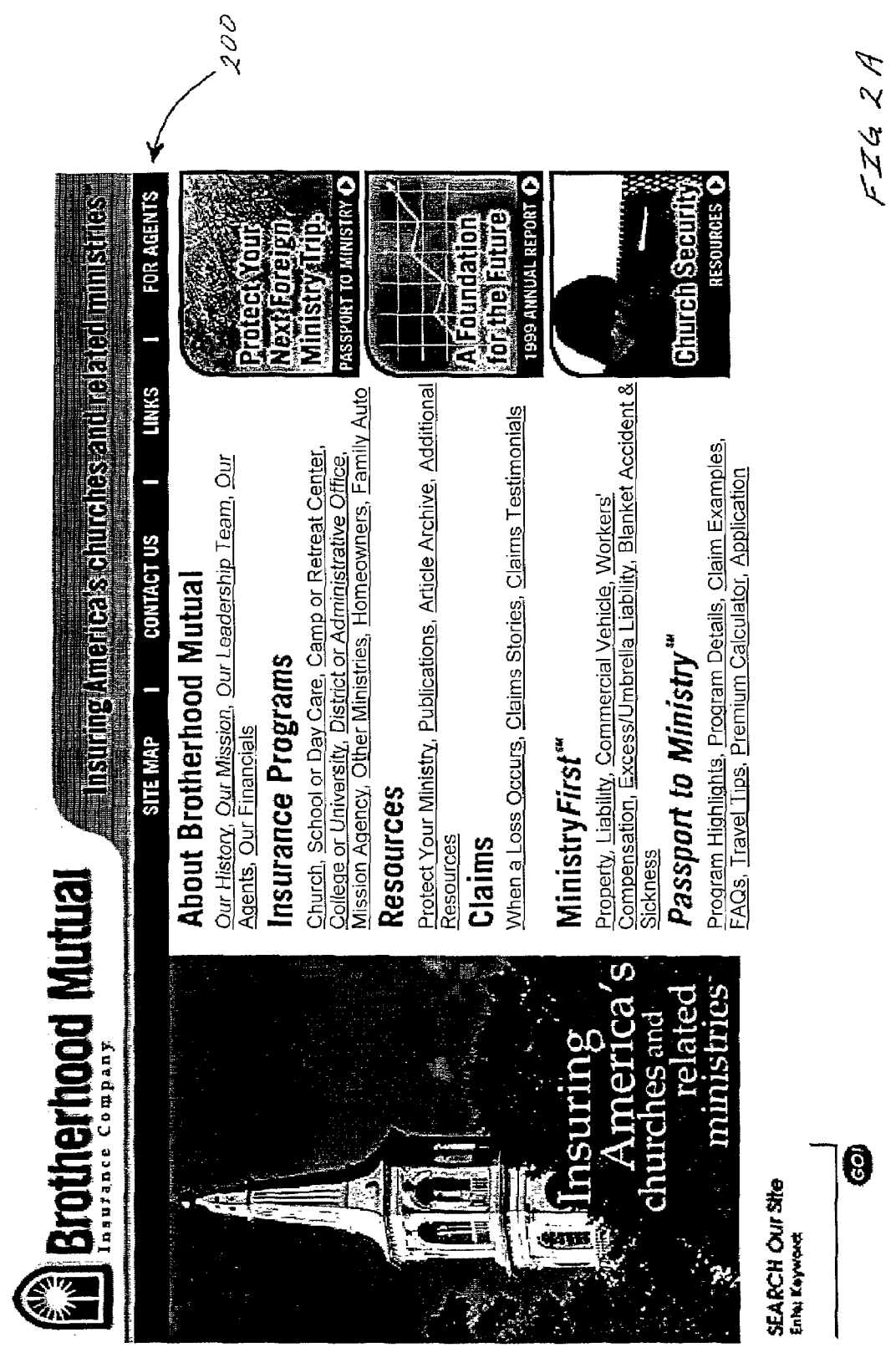
Figure 2B:
FIG. 2B is a screen display of the Brotherhood Mutual login page.

The process begins with an agent sign in as indicated at step S10. Here, the agent or potential customer connects to the Brotherhood Mutual web site using a standard web browser. This can be accomplished by connecting to the internet through the agent's internet service provider (ISP), by direct connection to the company's network, or other means provided by the company. When the connection to the insurance company's web site is accomplished, the insurance company's home page, shown in FIG. 2A, is presented on the agent's or potential customer's workstation. The agent selects the option "For Agents" from the menu bar 200 to proceed. The potential customer selects the option "Customer Quote". For agents, this is followed by the display in FIG. 2B, where the agent enters his Agent ID and password into the data boxes 210 in FIG. 2B. Upon entering this information and selecting the login button 215, the login information is transmitted from the workstation and received by the insurance company's server.

Figure 2C:
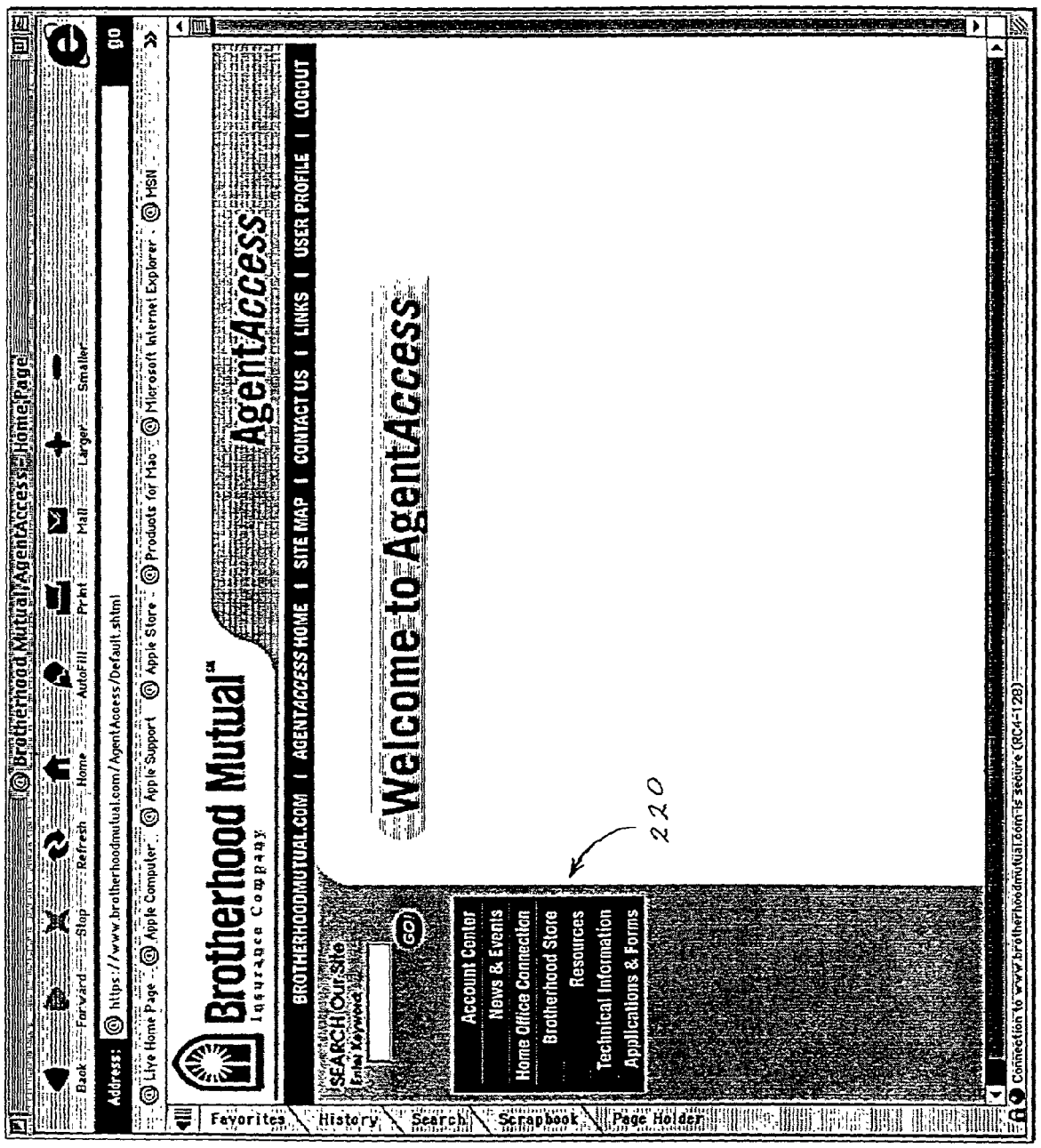
FIG. 2C is a screen display of the Brotherhood Mutual Agent Access system welcome page.

At step S20, authentication of the user takes place. The insurance company maintains a user directory on the home office computer. The user's ID and password are verified against this directory. If the user ID and password are valid, the welcome screen in FIG. 2C is displayed on the user's workstation at step S30 in FIG. 1. The user is also identified as an agent or potential customer during the verification of the ID. The display in FIG. 2C includes a list of menu options 220 available to the agent. Through the menu, the agent will select "Account Center" from the menu to work on an existing case or start a new case. This selection is made at step S40, whereupon the screen in FIG. 3A is presented, which shows the agent's current account list. This includes a list of client accounts 310 for whom there is ongoing activity. At this point, the agent can work on an existing account by selecting one of the accounts displayed or the agent can create a new account by selecting the "New Account" button from the tab line 300.

If the agent selects an existing account from the account list 310, the screen in FIG. 3B is displayed. The agent can then edit the account information by selecting "Edit Account" from the tab line 320 or the agent can view or edit quote information by selecting an entry from the quote menu 330, corresponding to step S40 in FIG. 1. A new account can also be started from this screen by selecting "New Account" from tab line 320. When "New Account" is selected, from this screen or from FIG. 3A, the screen of FIG. 3B is presented with the account information fields blank. The agent first supplies account information for the new client after which he could proceed with generating a quote by selecting an entry from the quote menu 330, again corresponding to step S40 in FIG. 1.

After selecting the quoting option at step S40, the agent is presented with the screens shown in FIGS. 4A-4L which represent the various pages of a quote. FIGS. 4I-4L show the "Liability Details" associated with the "Liability" coverage category. FIGS. 4I-4L reflect the detail including special information that would be required if all the liability coverages are selected.

If the agent is working on a new account, or if no quote has been generated for an existing account, the data fields on the forms will be blank and available for input of new information. Otherwise, the existing quote information is displayed. The various pages are displayed in response to the agent's selection from the tab line 400 in FIG. 4A. The tabs, Policy, Property, Locations, Liability, and Clergy, from tab line 400 represent the subcategories of information that when taken together form the basis for a quote and later an insurance policy.

Churches and other religiously affiliated institutions require specialized coverages to efficiently address the ministry-focused nature of these entities. Such coverages include, but are not limited to, the following: membership emotional injury, student emotional injury, clergy ordination/placement, sexual acts, counseling acts, religious communication, religious activity, discriminatory acts, Christian school and college coverages, Christian camp coverages, church transportation, foreign mission operations, as well as other ministry-specific coverages. In addition to these ministry-specific coverages, standard property, liability, automobile, and workers' compensation coverage are also provided.

When the agent selects "new quote", the agent must go to each page entering the appropriate information for that page. When the agent selects an existing quote to be used as a template, the agent goes to each page making appropriate changes. After the data entry is completed in the case of a new quote, or the necessary changes have been made to create a new quote from an existing entry, the agent can save the changes as a new quote as indicated at step S50 in FIG. 1. The quote data is saved on the web server and a copy is also prepared for transmission to the insurance company's server performing the rating process. It should be kept in mind that the client workstations, web servers, and the insurance company's home office computers can be different platforms. For instance, in the present implementation of the invention, Lotus Notes operates on the web server accessed from the client workstations (Lotus Notes is a registered trademark of Lotus Development Corporation of Cambridge, Mass.), while an AS400 computer is used for data processing and storage at the insurance company office (AS400 is a registered trademark of IBM Corporation of Armonk, N.Y.).

For potential customers who seek to obtain a quote through this process, information relating to the ministry (property and/or operations) is requested, after which steps S60, S70, and S80 described below occur, and the policy premium is displayed.

Referring again to FIG. 1, at step S60, the quote information is pre-processed prior to transmission to the insurance company's office system. This pre-processing can include reformatting appropriate fields, performing data translations, and any other adjustment required for storing the data on a particular platform. For instance, when the agent makes a selection by checking a box or answering "yes" or "no" to a question, this is often translated to a code letter or number that is used in the rate calculation process. When the pre-processing is completed, the quote information is saved on the insurance company computer as indicated at step S70. Both the web server copy and the office system copy of the data are available for use by other transactions so that data entry is minimized.

Upon collection of the quote information, the company's rate process can be invoked as indicated at step S80 to calculate insurance rates. Rate processes are known in the art and are customizable for particular types of coverage. The rate process can develop proposed rates based on an accumulation of the data in the various sub-categories of the quote information. Once rates are developed, the insurance company files are updated with the rate information at step S70. It should be noted that step S70 can be designed to perform multiple functions of storing new data records and updating existing data records.

Rate calculation is followed by step S90 where the new rated quote can be displayed and printed. FIGS. 5A-5E depict the display of a rated quote. In one version of the invention, the form of FIG. 5A is fixed in the upper portion of the display screen while the information of FIGS. 5B-5E can be scrolled in the lower portion of the display screen. The displays of FIGS. 5B-5E show in detail all of the factors taken from the quote information that became factors in determining the quoted rate. The quoted rate represents an accumulation of these factors and includes such things as coverages selected, coverage limits, valuations, and risks. The command line 500 in FIG. 5A presents the most commonly used options for the agent's selection for continuing the process. At this point, the agent can review the quote for accuracy and completeness. If any changes or corrections are needed, the agent could select the "Edit Quote" option which follows with step S100. Here, the quote forms of FIGS. 4A-4H are displayed again for input much the same as in step S50 where corrections or additional data are entered in much the same manner as the original quote input information.

Figure 3C:
FIG. 3A is a screen display of Account Center list screen.
FIG. 3B is a screen display showing the detail of an account.
Figure 4A:
Figure 4B:
Figure 4D:
Figure 4H:
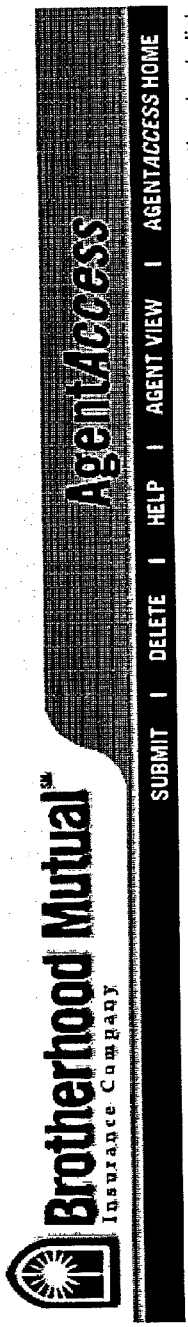
Figure 4L:

When the agent is satisfied with the quote information displayed at step S90, the agent has the option of initiating the creation of a formal proposal at step S110. The proposal is a specially prepared document for presentation to the client containing information about the agency, the insurance company, and a summary presentation of the rated quote. The proposal also can include references or links to information describing the insurance coverage listed in the proposal. The proposal is requested by returning to the account detail screen displayed in FIG. 3B. The proposal can be requested at any time after the quote is rated. The proposal cover page is shown in FIG. 3C. A complete proposal document is included as Appendix A. The agent will often proceed directly from finished quote to application creation, bypassing creation of the proposal.

A policy application is requested at step S120 which corresponds to the selection of "Convert to App" from command line 500 in FIG. 5A. The policy application is created from the quote information and certain items of supporting information including such things as survey reports or photographs. Scanned images of such documents, or digital photographs, can be attached and transmitted to the insurance company office for inclusion in a policy information file. The user has the option of entering the additional policy supporting information at the time a quote is requested; however, due to the additional data entry, agents tend not to elect this option. Customers or potential customers, on the other hand, may elect this option.

Figure 6A:

When the supporting information is provided, the policy application is printed as indicated at step S130. FIGS. 6A-13 provide an example of a typical draft policy application. Information is arranged by category as shown by the coverage category list 600 in FIG. 6A. The draft application will also indicate whether there are any errors or missing data that need to be addressed before a policy is issued. FIGS. 6A-6B show "General Information" data.

Figure 6C:
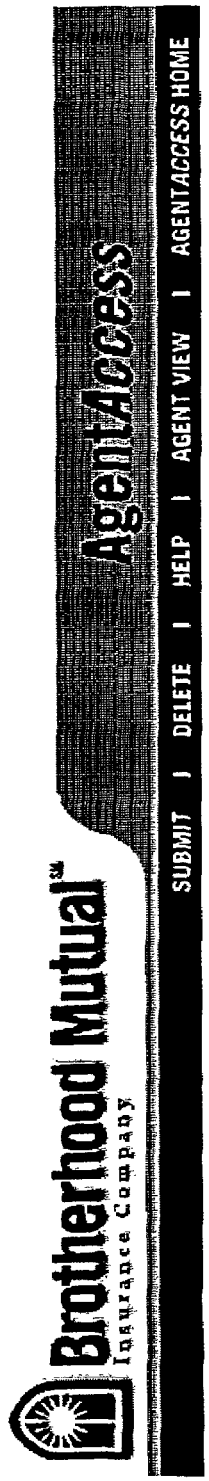
Figure 6D:
Figure 6F:
Figure 6J:
FIG. 6J depict screen displays associated with the Property Coverages coverage category in a policy application.

FIG. 6C displays any errors or missing data associated with this information category, "General Information", in this case. The error display, if any errors exist, is presented when the agent tries to move from one category to another. This feature is characteristic of all the coverage category displays. FIG. 6D displays a page for "Mortgagees, Loss Payees, & Additional Insureds". The highlighted category label 620 includes the notation "New Entry" indicating that there has previously been no data entered for this category. Errors are displayed as indicated above with a display similar to that in FIG. 6C. However, in situations where no data has been entered, a pop up window, FIG. 6E, is presented indicating that any data entered will not be saved if required fields such as the name field, 630 in FIG. 6D is not supplied. An example is shown in FIG. 6E.

FIGS. 6F-6J are representative displays for the categories "Insurance History" and "Property Coverages".

Figure 7D:
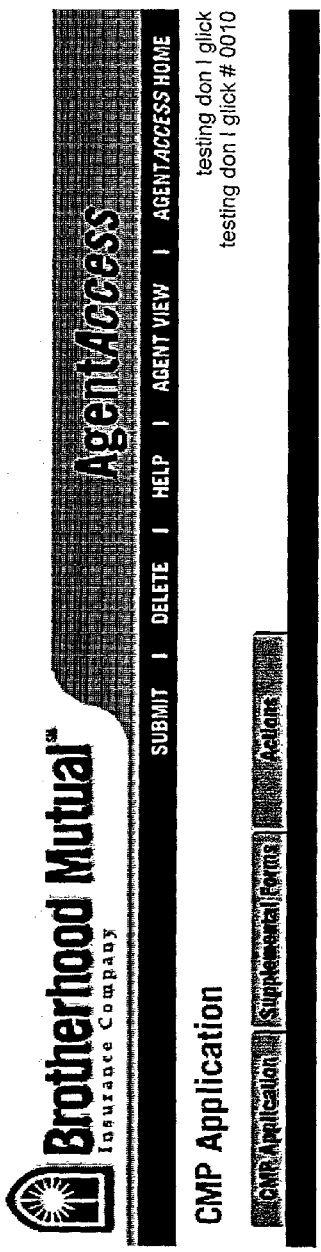
Figure 7E:
Figure 9A:
FIGS. 9A-9B depict screen displays associated with a coverage category, in this case, Liability Coverages, needing additional information in a policy application.
Figure 9B:
Figure 11G:
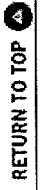
FIG. 11 depict screen displays showing a second example of a new entry for a coverage category having no previous information in a policy application.

In some cases a coverage category can expand into multiple sub categories. This is exemplified by the display for "Buildings & Coverages" shown in FIGS. 7A-7G. As indicated by list 700 in FIG. 7A, this category has been expanded to include the sub-categories "Church" and "School". FIGS. 7A-7D are representative of the displays for the "Church" sub-category. FIGS. 7E-7G are representative of the displays for the "School" sub-category. Other religiously-affiliated sub-categories may also be displayed.

FIGS. 8A-8C depict displays for the "Inland Marine" category. Again this represents a category having no information previously entered as indicated by the "New Entry" notation in list 800. Here also, a pop up window similar to that in FIG. 6E will appear upon leaving this display without having entered required fields.

Figure 11:
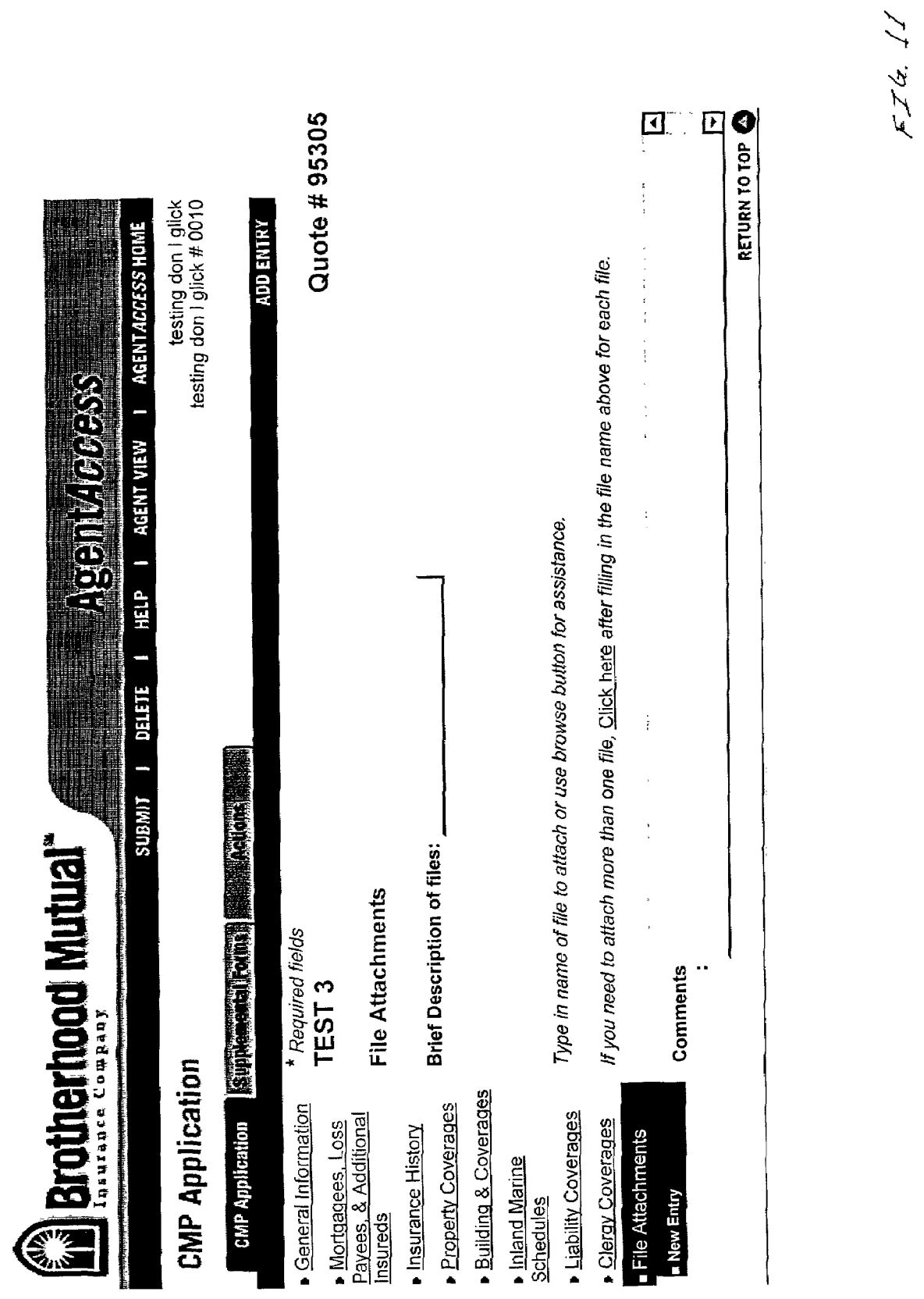

FIGS. 9A-11 are representative displays for the categories "Liability Coverages", "Clergy Coverages", and File Attachments".

Figure 12H:

Referring again to FIG. 6A, tab line 605 contains the tabs "CMP Application", "Supplemental Forms", and "Actions". The displays depicted in FIGS. 6A-11 are all grouped under the tab "CMP Applications". The "Supplemental Forms" tab allows additional information to be attached to the policy application. FIG. 12A appears when this tab is selected. Again, list 1200 indicates the presence of sub-categories. FIGS. 12A-12H present examples of supplementary information relating to the "Church Profile" and "Liability Risk Survey" sub-categories. As in the previous examples, error screens as shown in FIGS. 12C and 12H appear if errors are present when the agent tries to leave these options. Although not shown, in a similar fashion, supplementary information can be added for "School/Day Care Profile", "Property Risk Survey", and other ministry-related sub-categories.

Figure 13:
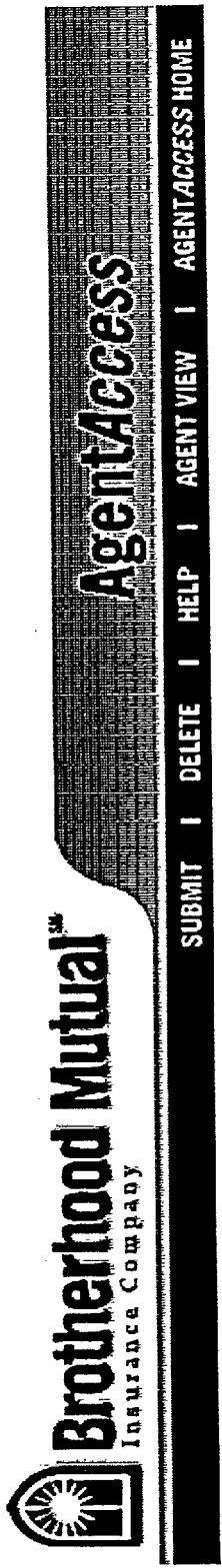
FIG. 13 is a screen display listing the actions available to the agent at the policy application stage of the process of the current invention.

The last tab, "Actions" displays a list FIG. 13 of the actions available to the agent.

While several of the screen displays have been represented by multiple figures, it should be kept in mind that on an actual monitor, these multiple pages are accessed by scrolling through the display rather than actually moving between pages.

Once a policy application has been produced for the agent, the quote from which it is derived can no longer be updated. The agent can, however, select the "Revert to Quote" option from the actions listed in FIG. 13 to change a quote at this stage. If this is done, the agent must submit the quote for rating before any further action can be taken. Once the application is completed and submitted, neither the quote nor the application may be changed.

The quote records are updated to indicate that a draft application has been created. This is reflected in the quote display of FIG. 3. When a draft application has been requested, the "Application Status", 310 in FIG. 3, is updated from "None", indicating that the draft application has not been created, to "Draft" indicating that a draft application has been created.

The process of this invention also provides certain monitoring and reporting capabilities for insurance office personnel. The ability to review existing quote activity and produce various management reports is provided at step S140. These functions support the ability of the home office to evaluate, oversee, and manage agent activity to improve profitability of the company. In particular, since all quoting activity takes place on the home office computers, better agency monitoring is provided. Step S140 provides access to quote and policy information needed by various groups such as raters to verify that rates are appropriate, appraisers who review valuations, underwriters for approval of coverage, customer service, and others. Management reporting may include such items as quote and policy activity by status, date, premium quoted, customer name, or agency, among others.

At step 150, all prerequisites have been completed and the new insurance policy issues.

This invention also allows for an automated underwriting process in which a series of specific questions are asked in relation to a religiously-affiliated entity. If the responses fall within predetermined parameters, then the policy is rated and issued without human intervention.

Various back office enhancements are possible because of the web based quoting system of the present invention. These include decreased home office data entry, increased accuracy due to less redundant data entry, increased speed of delivery of information due to the elimination of mail service from the process, and increased efficiency. In particular, the ability to edit data during data collection improves the integrity of the quoting and underwriting processes. Management capability is also enhanced through the provision of improved reporting such as quote-to-issue ratio analysis.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A computer network system for generating insurance quotes, rates, and applications, including for ministry-specific coverages, for ministries and religious institutions upon input of information related to such ministries and religious institutions by a user, said computer network system comprising:

a user computer with a graphic user interface adapted to display an inquiry and receive input information from a user;

a server computer in network communication with said user computer, said server computer including memory and a plurality of instructions, a first portion of said plurality of instructions enabling said server computer to generate an initial inquiry and send said initial inquiry to said user computer for interaction with the user, with said initial inquiry relating to specifics of a potential ministry or religious institution insurance policy including information regarding activities including at least one of camps, schooling, daycare, counseling programs, and foreign mission operations, a second portion of said plurality of instructions enabling said server computer to receive said input information from said user and to generate an additional inquiry including information about volunteers participating in said activities and send said additional inquiry to said user computer for interaction with the user, with said additional inquiry being based at least in part on said input information, a third portion of said plurality of instructions enabling said server computer to receive further input information from said user computer and calculate at least one of a quote and a rate for a ministry or religious institution insurance policy, including ministry-specific coverages, based on said input information and said further input information, a fourth portion of said plurality of instructions enabling said server computer to issue a policy for one of ministries and religious institutions containing ministry-specific coverages and premium billing information based on said input information and said further input information; and a fifth portion of said plurality of instructions enabling said server computer to generate a communication from the server computer that, when received by the user computer, causes the user computer to determine if the user is an insurance agent, and when the user is determined to be an insurance agent then generates a series of menus at least one of the menus including a user edit screen enabling the agent to edit, save, and retrieve stored said input information and said further input information.

2. In a computer, a method of generating ministry or religious institution insurance quotes and rates, including for ministry-specific coverages, upon input of ministry or religious institution related information by a user on a user computer connected to a server computer over a network, said method comprising the steps of:

generating a communication from the server computer that, when received by the user computer, causes the user computer to determine if the user is an insurance agent;

generating an initial inquiry on the server computer and sending the initial inquiry to the user computer to be displayed for interaction with a user, with the initial inquiry relating to specifics of a potential ministry or religious institution insurance policy that includes ministry-specific coverages including information regarding activities including at least one of camps, schooling, daycare, counseling programs, and foreign mission operations;

receiving the input information from the user, generating an additional inquiry including information about volunteers participating in said activities, and sending the additional inquiry to the user computer for interaction with the user, with the additional inquiry being based at least in part on the input information, and when the user is determined to be an insurance agent generating a series of menus, at least one of the menus including a user edit screen enabling the agent to edit, save, and retrieve stored input information;

receiving further input information from the user computer in response to the additional inquiry and calculating at least one of a quote and a rate for a ministry or religious institution insurance policy containing ministry-specific coverages based on the input information and the further input information; and issuing said policy for one of ministries and religious institutions containing ministry-specific coverages and related billing information based on said input information and said further input information.

3. A machine-readable program storage device for storing encoded instructions for a method of quoting, rating, and saving quote information for insurance transactions that include ministry-specific coverages through a web based interface, said method comprising the steps of:
  generating a communication from a server that, when received by a user computer, causes the user computer to determine if a user is an insurance agent;
  collecting quote related input information including information regarding activities including at least one of camps, schooling, daycare, counseling programs, and foreign mission operations on a user computer and sending said quote information to said server;
  receiving and storing said quote information on said server, and when the user is determined to be an insurance agent generating a series of menus, at least one of the menus including a user edit screen enabling the agent to edit, save, and retrieve stored input information;
  invoking a rate calculator on said server and calculating rates based on said quote information;
  storing said calculated rates with said quote information on said server; and
  generating a communication to cause displaying of a quote document for one of ministries and religious institutions on the user computer based on said quote information and said calculated rates.

4. The machine-readable program storage device of claim 3 with the method further comprising:
  requesting a policy application on said user computer and sending said application request to said server;
  compiling policy application data based on said quote information and said calculated rates; and
  printing said policy application from said policy application data on said user computer.

5. The machine-readable program storage device of claim 3 wherein said quote document is displayed and a hardcopy is printed on the server.

6. The machine-readable program storage device of claim 4 wherein a hardcopy of said policy application is printed on said server.

7. The machine-readable program storage device of claim 4 wherein changes to said quote information are prohibited after said policy application is requested by checking the status of said policy application on the server.

8. The machine-readable program storage device of claim 4 with the method further including, prior to said requesting step, the step of creating a proposal, said proposal containing references or links to detailed coverage information.

9. The machine-readable program storage device of claim 3 with the method further including, prior to said collecting step, the step of authenticating a user.

10. The machine-readable program storage device of claim 3 with the method further including, after said invoking step, the step of storing said policy application data on said server.

11. The machine-readable program storage device of claim 10 with the method further including the step of issuing said policy and billing information on said server.

12. The machine-readable program storage device of claim 11 wherein said policy and billing information is issued without human evaluation when said quote information is within a set of pre-determined parameters.

13. The method of claim 2, wherein if the user is determined to be an insurance agent, then the user is presented with an account list of the user.

14. The method of claim 13, wherein the account list permits access to insurance information for at least one individual who is not the user.

15. The method of claim 13, wherein an agent user is permitted to create a new quote related to a second individual by accessing data relating to a first individual.

16. The machine-readable program storage device of claim 3, wherein if the user is determined to be an insurance agent, then the user is presented with information relating to at least one client of the user.

17. The machine-readable program storage device of claim 16, wherein the information relating to at least one client of the user includes insurance information for a first individual and insurance information for a second individual.

18. The machine-readable program storage device of claim 3, wherein if the user is determined to be an insurance agent, then the user is permitted to edit information pertaining to an individual who is not the user.

19. The machine-readable program storage device of claim 3 further including, prior to said collecting step, the step of authenticating the user.

20. The machine-readable program storage device of claim 3, wherein an agent user is permitted to select an existing quote, edit data within the selected quote, and save the edited quote as a new quote.

* * * * *

UNITED STATES PATENT AND TRADEMARK OFFICE
CERTIFICATE OF CORRECTION

PATENT NO. : 7,627,490 B2 Page 1 of 1
APPLICATION NO. : 09/702489
DATED : December 1, 2009
INVENTOR(S) : Glick et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1064 days.

Signed and Sealed this

Second Day of November, 2010

David J. Kappos
*Director of the United States Patent and Trademark Office*